(12) United States Patent
Kukhar et al.

(10) Patent No.: US 8,536,234 B2
(45) Date of Patent: Sep. 17, 2013

(54) PROCESS FOR GENERATION OF SYNTHETIC FUEL FROM CARBONACEUS SUBSTANCES

(75) Inventors: Valerii Kukhar, Kiev (UA); Valeriy Bortyshevskyy, Borispol (UA); Nataliia Khimach, Kolesniky (UA); Viktor Burdeynyy, Kiev (UA); Rayisa Korzh, Kiev (UA); Svitlana Melnykova, Kiev (UA); Dmytro Kamens'kyh, Kiev (UA)

(73) Assignee: Amerol Enterprises, LLC, Boardman, OH (US)

( * ) Notice: Subject to any disclaimer, the term of this patent is extended or adjusted under 35 U.S.C. 154(b) by 220 days.

(21) Appl. No.: 12/897,584

(22) Filed: Oct. 4, 2010

(65) Prior Publication Data

US 2012/0083538 A1  Apr. 5, 2012

(51) Int. Cl.
*C07C 27/00* (2006.01)

(52) U.S. Cl.
USPC ........... 518/700; 518/702; 518/703; 518/704; 518/713; 518/714; 518/715

(58) Field of Classification Search
USPC .................. 518/700–704, 713–715
See application file for complete search history.

(56) References Cited

U.S. PATENT DOCUMENTS

| | | | |
|---|---|---|---|
| 4,113,446 A * | 9/1978 | Modell et al. | 48/202 |
| 4,158,637 A | 6/1979 | Jones | |
| 4,344,838 A | 8/1982 | Mitchell | |
| 5,069,765 A * | 12/1991 | Lewis | 204/173 |
| 6,720,283 B2 | 4/2004 | Ding | |
| 7,455,704 B2 | 11/2008 | Garwood | |
| 7,501,374 B2 | 3/2009 | Galiasso | |
| 7,670,985 B2 | 3/2010 | Ding | |
| 2002/0095867 A1 | 7/2002 | Katayama | |
| 2003/0024699 A1 | 2/2003 | Vinegar | |
| 2003/0226766 A1 * | 12/2003 | Orlebeke | 205/688 |
| 2005/0107481 A1 * | 5/2005 | Janssen et al. | 518/726 |
| 2007/0186474 A1 | 8/2007 | Rabovitser | |
| 2008/0134658 A1 | 6/2008 | Yoshida | |
| 2008/0222956 A1 | 9/2008 | Tsangaris | |
| 2009/0159355 A1 | 6/2009 | Garwood | |
| 2009/0206007 A1 | 8/2009 | Allam | |

OTHER PUBLICATIONS

Chemical abstract, CN 1544580, Nov. 2004.*
Dunn, Seth, Hydrogen futures: toward a sustainable energy system, Int. J. of Hydrogen Energy, 2002, V. 27, No. 3, p. 235-264.
Yermonkhina, NI; Bukhtiyarov, V.K.; Kishenya, Y.V.; Illin, V.G.; Manorik, P.A.; Kapitanchuck, L.M.; Smiyan, O.D.; Puziy, A.M.; Kamenskih, D.S.; Bortyshevskyy, V.A., Nanocomposite Ni/TiO2—Materials for Hydrogen Generation Systems, International Journal of Hydrogen Energy.—2011.—V. 36.—p. 1364-1368.
Bortyshevskyy, V.A.; Kamenskyh, D.S.; Yevdokymenko, V.O.; Melnykova, S.L.; Boldyreva, N.O.; The Method of the Investigation of Membranes' Proton Conductivity Under High Temperature, (Дослідження протонон оовідних властивостей вуглецевих мембран за високих температур)/ )/ В.А. Бортишевський, Д.С. Каменських, В.О. Євдокименко, С.Л. Мельникова // Каталіз и нефтехимия .—2010.—No. 18.—C. 47-50.
Korzh, R.V; Bortyshevskyy, V.A.; Tkachenko, T.V.;Yevdokymenko, V.O.; Boyko / Physicochemical Properties of the Membranes Based on MSC-H и Purolite CT-275 Sulphocationic Resins // Zhurnal prikladnoy chimii.—2007.—V. 80, No. 8.—p. 1296-1301. (Р.В. Кор ж, В.А. Бортышевский, Т. В. Ткаченкс, В.А. Евдокименко,, В.В. Бойко.. Физико-химически е свойства мембран на мембран на основе сульфок тионитов MSC-H Purolite CT-275. // Журнал прикладной химии. .—2007.—Т. 80, No. 8.—C. 1296-1301.)
Bortyshevskyy, V.A.; Kamenskyh, D.S.; Yevdokymenko, V.O.; Korzh, R.V.; Tkachenko, T.V.; Mel'nikova, S.L.; Motorny, V.G., Synthesis of Carbonic-Nickel Nanostructures and Their Application for Proton Pumps.—In: Carbon Nanomaterials in Clean Energy Hydrogen Systems, Publication by NATO Science for Peace and Security Programme.—2008.—p. 137-149. (ISBN 978-1-4020-896-4).
Bortyshevskyy, V.A.; Kamenskyh, D.S.; Yevdokymenko, V.O.; Melnykova, S.L.; Boldyreva, N.O.; Research of proton conductivity of graphen-graphan containing membranes.—Proceedings of the XI International Conference "Hydrogen Material Sceince and Chemistry of Carbon Nanomaterials" ICHMS'2009. Ed.: D.V. Schur, S. Yu. Zaginaichenko, T.N. Vezirogly , V.V. Skorokhod . Aug. 25-31, 2009. Yalta—Crimea—Ukraine.—Kiev, Aheu-Ukraine, 2009, p. 594-597.

* cited by examiner

*Primary Examiner* — Jafar Parsa
(74) *Attorney, Agent, or Firm* — George W. Moxon, II; Brian P. Harrod (57) ABSTRACT

A method and apparatus for the generation of synthetic motor fuels and additives to oil fuels, $C_1$-$C_4$ alcohols, hydrogen, methane, synthesized gas ($H_2$+$CO_2$) by hydrothermal treatment of carbonaceous compounds by providing a two-stage carbon gasification process operated under the supercritical conditions of $H_2O$ and $CO_2$, including a first stage gasification reactor having a reaction zone for the conversion of carbonaceous compounds and a second stage reactor for the conversion of the products of the first stage reactor; feeding a aqueous suspension of carbonaceous compound in an amount of at least 30% by weight and an alkali metal or alkaline-earth metal catalyst or reactive OH-species from an electrolyzer through said first stage gasification reactor as a supercritical fluid at a volume velocity of 0.01-0.05 g of carbon per 1 $cm^3$ per hour, at a carbon/catalyst mole ratio of between about 70/1 and 90/1, at a temperature of 390-450° C., and under a pressure of about 225 to 500 bars; feeding the reaction products from the first stage reactor to the second stage reactor over a copper-zinc catalyst at the temperature of 200-280° C. and under a pressure of at least about 100 bars so that any gases generated in the first stage are converted into $C_1$-$C_4$ alcohols with the weight ratio of $C_1$-$C_2$ to $C_3$-$C_4$ between about 0-35% to 100-65%.

18 Claims, 2 Drawing Sheets

PROCESS FOR GENERATION OF SYNTHETIC FUEL FROM CARBONACEUS SUBSTANCES

BACKGROUND OF THE INVENTION

The present invention is directed to a process for making synthetic motor fuel, including hydrogen, motor fuel, gasoline, diesel and fuel oil by processing low-grade coals, heavy still bottoms, phytogenous hydrocarbons, and wood wastes.

Hydrogen is considered to be the most promising fuel of the future (Dunn S., Int. J. of Hydrogen Energy, 2002, V. 27, No. 3, P. 235-264). 'Hydrogenous society' of the future shall be based on hydrogen energy, and the major direction hereof is hydrogen generation owing to water decomposition under the effect of sunlight with the further usage of hydrogen in fuel components or as a car fuel.

One of the most serious issues in application of hydrogen as a motor fuel is a selection of a storage method on board of a car vehicle. Hydrogen is the lightest of all chemical elements that is why in the given volume it is stored in much fewer quantities than other kinds of fuel. Thus, at room temperature and standard atmospheric pressure hydrogen occupies approximately 3 thousand times bigger volume than a gasoline of a similar energy quantity. That is why to fill a car with enough quantity of fuel, it is necessary either to discharge hydrogen under high pressure, or to use it in the form of a cryogenic liquid, or to equip cars with sophisticated fuel systems.

The second promising direction of a synthetic motor fuel is a dimethyl ether (DME) generated from a syngas containing hydrogen and a carbon oxide. The major shortcoming of DME usage as a diesel fuel is its aggregative state. Under ordinary conditions it is a gas that is why its storage and transportation may cause problems connected with hydrogen storage and transportation. A wide application of DME may be complicated also by the necessity to carry out profound changes in the infrastructure of filling station chains.

The closer synthetic fuel is a propyl and butyl alcohol mixture (PBAM) generated when deliberately fermenting agricultural commodities such as wheat, barley, corn, etc. The shortcomings of the given process are low productiveness and a high price of the raw material. A wide application of DME and PBMA are restrained by the high price of syngas that is generated mainly from a natural gas (methane). The current processes of syngas generation from carbons are technologically complicated and contaminating environment and require a sufficient capital investment.

The main requirement to a syngas is a high content of hydrogen—not less than 60-80%, vol.—and low content of sulphur—not more than 5-10 ppm. The second component of syngas is a high-toxic substance that leads to high requirements to safety measures of the given process. A high temperature at standard processes of syngas generation is achieved by burning a carbon mass using oxygen or its mixture with air or aqueous vapour as a gasifying agent. The necessity to apply oxygen increases significantly both primary and secondary financial expenditures.

A known a method of syngas generation is SU No 1,686,885, which teaches, when coal-bearing layer processing, including drilling of two well systems to supply an oxidant and discharge of gasification products where a saturated saltpeter solution is pumped down to increase the temperature and efficiency of coal layer processing by means of a diverter well network. The shortcoming of this method is high content of carbon dioxide in a product.

Another well-known method is RU No 2090750, which teaches coal seam uncovering by wells, underground gas-generator ignition and gas supply provision when maintaining supercritical pressure and temperature by means of opening well heads and lowering a water level in dewatering wells. The shortcoming of this method is low content of carbon in gasification products due to supplying air as an oxidant containing big quantities of nitrogen. In the course of gasification NOx nitrogen oxides are developed that disturb the ecological balance.

Yet another well-known method is RU No 22354820 C1, which teaches adding aluminum powder in proportion Al:H2O=1:(4-5) parts of weight under pressure to provide the supercritical water conditions to increase the discharge of a syngas and carbon content into a burned zone of the underground generator. In what connection oxygen is not supplied externally but generated in the burned zone from water according to the reaction. At that hydrogen, carbon monoxide and methane are generated. The shortcoming of this method is complexity and high marginal cost.

US Pat. Publication No. 2009/0206007 discloses the conversion of coal into syngas in a reaction vessel under supercritical conditions (P=300 бар); the mixture of water and oxygen is used as an oxidant, and sodium hydroxide (0.75%, weight) is used as a catalyst. The process has two stages. At the first stage at the temperature 580-600° C. coal oxidation happens, at the second stage the carbon-dioxide extraction of products is carried out at the temperature of 380-420° C. and under the supercritical pressure. A carbon conversion of 41-60% is achieved, and the process yields gaseous, liquid and solid phases. The gaseous phase contains $H_2$, CO and $CO_2$. The liquid phase contains benzene, toluene, and xylene. Hydrocarbons containing 18-20 atoms of carbon are found in the solid phase. The problems of this method are high product costs, the need of further product purification, and further processing to generate motor fuels.

The gases generated by gasification in accordance with these prior art methods are not suitable for their immediate efficient usage as a fuel for current internal-combustion engine models and require additional processing.

Fischer-Tropsch processes for hydrocarbon synthesis from CO and $H_2$ (syngas) are known to produce gaseous and liquid hydrocarbons as well as oxygenates which, in general, follow the well-known Anderson-Schulz-Flory product distribution.

These reactions can be carried out in fixed, fluidised or slurry bed reactors. The production of olefins and liquid fuels, especially in the gasoline range products, is most favoured by synthesis carried out in a two-phase fluidized bed reactor operating at 350° C. and 20 bar or higher pressures and usually utilizing a fused alkali promoted iron catalyst. This is known as a high temperature Fischer-Tropsch (HTFT) process.

In terms of the ideal Anderson-Schulz-Flory product distribution it is clear that the $C_5+$ selectivity has a maximum value of around 65%. In a commercial high temperature Fischer-Tropsch process performed in a fluidized bed reactor, the optimum $C_5+$ compound yield is usually not realized, thus resulting in a much lower $C_5+$ compound selectivity. The reason for this is that at optimum conditions for the production of maximum $C_5+$ compounds the process is negatively influenced by other factors, one important factor being the formation of elemental carbon. The disadvantage is that the elemental carbon is deposited on the iron catalyst which causes swelling and disintegration of the particles. This powdering of the catalyst particles results in the plugging of fixed bed catalyst reactors. In a fluidized bed the fines which are produced as a result of catalyst disintegration have a high carbon content and hence have a low particle density. Because of this the fines are readily carried out of the reactors by effluent gas and will foul the downstream equipment and also the heavy oil products. Due to the swelling of the individual particles, the entire fluidized catalyst bed expands which negatively influences the reaction.

In order to reduce carbon formation one can reduce the levels of alkali promoter for the iron catalyst and one can also increase the $H_2$:CO ratio in the syngas to be converted to hydrocarbons. However, it is known that iron based Fischer-Tropsch catalysts with a low alkaline promoter level tend to produce light hydrocarbons and are also not easily converted to the $C_5+$ compound range. That is, it has been found that a HTFT process with less than 0.02 mol alkali metal promoter per 100 g iron (even if a $H_2$:carbon oxide ratio of less than 2 is used) favors products in the $C_1$ to $C_4$ compound range as have been published in Catalysis Science and Technology, Volume 1, 1981, pages 202-209 and WO 0197968.

The situation is accordingly that if conditions are selected (either a low alkali level or a high $H_2$:CO ratio) to reduce formation of elemental carbon, it is expected that hydrocarbon products in the $C_1$ to $C_4$ range will be favored, thus a synthesis hydrocarbon product with less than 30% by weight of $C_5+$ product will form.

SUMMARY OF THE INVENTION

A method and apparatus for the generation of synthetic motor fuels and additives to oil fuels, $C_1$-$C_4$ alcohols, hydrogen, methane, synthesized gas ($H_2$+$CO_2$) by hydrothermal treatment of carbonaceous compounds by providing a two-stage carbon gasification process operated under the supercritical conditions of $H_2O$ and $CO_2$, including a first stage gasification reactor having a reaction zone for the conversion of carbonaceous compounds and a second stage reactor for the conversion of the products of the first stage reactor; feeding a aqueous suspension of carbonaceous compound in an amount of at least 30% by weight and an alkali metal or alkaline-earth metal catalyst or reactive OH-species from an electrolyzer through said first stage gasification reactor as a supercritical fluid at a volume velocity of 0.01-0.05 g of carbon per 1 cm$^3$ per hour, at a carbon/catalyst mole ratio of between about 70/1 and 90/1, at a temperature of 390-450° C., and under a pressure of about 225 to 500 bars; feeding the reaction products from the first stage reactor to the second stage reactor over a copper-zinc catalyst at the temperature of 200-280° C. and under a pressure of at least about 100 bars so that any gases generated in the first stage are converted into $C_1$-$C_4$ alcohols with the weight ratio of $C_1$-$C_2$ to $C_3$-$C_4$ between about 0-35% to 100-65%.

The present invention generates synthetic motor fuel by processing of carbonaceous resources, such as coal, nonconforming coals, heavy bituminous oils, hydrocarbon refinery wastes, wood wastes and agricultural wastes, at a first stage with aqueous solutions of catalyst under the supercritical conditions and catalytic transformation of the obtained mixture under the supercritical conditions at the second stage into alcohols mixture; as a result the generated alcohols may be immediately used as a motor fuel solely or mixed with oil fractions.

The present invention results in a significant increase in the availability of the raw materials resources and a reduction of hazardous emissions into the atmosphere, especially sulphur, nitrogen and carbon oxides. The invention allows employing low-active carbon dioxide ($CO_2$) in the process of fuel generation to produce such fuels as hydrogen, dimethyl ether, propyl and butyl alcohols, as well as methanol and ethanol as additives to gasolines of oil origin.

BRIEF DESCRIPTION OF THE DRAWINGS

The present invention will now be described by the way of a non-limiting example, with reference to the attached drawings in which.

DETAILED DESCRIPTION OF THE INVENTION

The present invention is directed to a process for the generation of synthetic motor fuel by processing of carbonaceous resources at a first stage with aqueous solutions of catalyst under supercritical conditions and catalytic transformation of the obtained mixture under the supercritical conditions at the second stage into alcohols mixture. The so generated alcohols may be immediately used as a motor fuel solely or mixed with oil fractions.

Supercritical water is water which is at a temperature and pressure exceeding its critical temperature and critical pressure. The critical temperature of water is the temperature above which water cannot be liquefied by an increase in pressure, i.e. 374° C. (647K). The critical pressure of water is the pressure of water at its critical temperature, i.e. 22.1 MPa (221 bar).

By carbonaceous materials or resources, we mean material that is rich in carbon, comprises at least carbon and hydrogen, and has a high carbon to hydrogen ratio. This would include carbonaceous resources such as coal, nonconforming coals, heavy bituminous oils, hydrocarbon refinery wastes, wood wastes and agricultural wastes.

The present invention results are achieved in the first stage by gasification of carbonaceous compounds, such as, raw brown coals or hydrocarbon containing materials using a catalytic aqueous solution containing hydroxides or carbonates of alkaline-earth metals (preferably magnesium or calcium) with mole ratio of carbon/metal (70-90)/1, which is added into a raw paste (suspension) of carbon material and the process is carried out in a flowing mode under supercritical conditions at the temperature of 400-450° C. and the pressure of 225-500 bars, preferably 240 bar. The second stage is the conversion of the generated gases with $H_2/CO_2$ mole ratio being 4/18 into $C_1$-$C_4$ alcohols mixture under the pressure of at least 100 bars, preferably 100-180 bar, with 100-150 also being preferred, and at the temperature of 240-270° C. over a copper-zinc catalyst. The alcohols by weight ratio $C_1$-$C_2/C_3$-$C_4$ is to between about 0-35% to 100-65%, preferably 1/4.

The results in the present invention in the first stage of the invention can also be achieved by the first stage of gasification of raw brown coals or hydrocarbon containing materials using the catalytic solution containing hydroxides or carbonates of alkaline-earth metals (preferably magnesium or calcium) with mole ratio of carbon/metal (7-12)/1 being supplied into a raw paste (suspension) and the process is carried out in a flowing mode under supercritical conditions at the temperature of 400-450° C. and the pressure of about 225 to 500 bars, preferably 240 bar, and at the second stage the generated gases are converted into almost pure hydrogen under the pressure of 100 bar and at the temperature of 200-220° C. over the copper-zinc catalyst. Hydrogen is formed by water decomposition. The part of reducer of hydrogen is acted by carbon. The last one binds the oxygen of water into carbonate salts. Pure hydrogen may be used a fuel as an alternative to an oil fuel or burnt in fuel cells to produce electrical energy.

The first stage of the present invention may further be achieved by the gasification of raw brown coals or hydrocarbon containing materials the catalytic solution containing hydroxides or carbonates of alkaline metals (preferably sodium or potassium) with mole ratio of carbon/metal (70-90)/1 being supplied into a raw paste (suspension) and the process is carried out in a flowing mode under supercritical conditions at the temperature of 400-450° C. and under the pressure of 240 bar, at the second stage the generated gases with $H_2/CO_2$ mole ratio being 2/4 are converted mainly into $C_1$-$C_4$ alcohols fraction under the pressure of 100-180 bars and at the temperature of 240-270° C. using a copper-zinc catalyst. The alcohols by weight ratio $C_1$-$C_2$/$C_3$-$C_4$ is 2/1. This fraction may be used as a diesel fuel or an additive to oil.

The first stage of the present invention can be achieved, further, by the gasification of nonconforming coals or hydrocarbon materials in a process where the catalyst input is done by the connection of vertical electrolytic cell of KARO system (such as that developed by German electrochemist, H. Caro) as a generator of reactive hydroxyl species of carbon gasification, although other electrolytic cells could be employed. The gas generated with $H_2/CO_2$ mole ratio being 2/8 in such a way is supplied for the second stage where propyl and butyl alcohols fractions as a synthetic motor fuel is formed using a copper/zinc catalyst under conditions similar to the forms 1-3. The alcohols by weight ratio $C_1$-$C_2$/$C_3$-$C_4$ is 4/1. In this process variation, catalysts are not required at the first stage of the process thus improving the content of solid wastes, which will consist of unreacted coal having a purity of about 98%, with the impurity being quartz sand. The liquid phase of wastes is small by volume and could be further added into a (furnace) charge to produce cement.

In any of the enumerated forms of the process of synthetic motor fuel generation the liquid wastes formed on the second stage contain water-soluble organic compounds such as acids, ethers, ketones, aldehydes and, mainly, methanol. These wastes are easily reconverted at the first stage of the process.

The wastes generated at the first stage will be in the form of liquid and sold phases. In some cases they will contain a pure unconverted carbon which may be used to produce electrodes for angular melting furnaces, tire production as well as for burning in thermal power plants. The liquid phases of wastes contain mainly hydroxides, sulphites and sulphates of alkali elements which may be regenerated with the extraction of the initial catalyst and generation of insoluble sulphites and sulphur.

The gas generated in the first stage will be supplied to the second phase where under conditions similar to the first stage, but using a copper and zinc catalyst, a synthetic motor fuel is generated in the form of propyl and butyl alcohols fractions. The second stage process will also generate waste in the form of a liquid phase containing water-dilutable organic compounds such as acids, ethers, ketones, aldehydes and, mainly, methanol is gained at the second phase. These wastes are easily reconverted at the first phase of the process.

Figure 1:
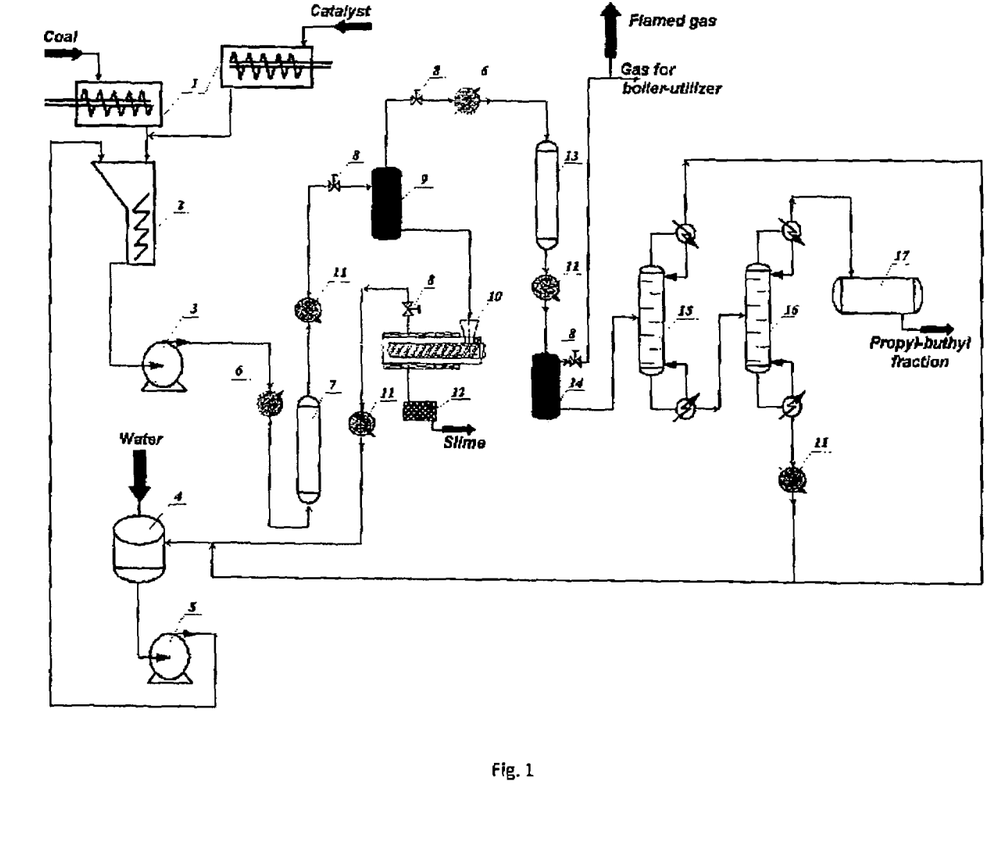
FIG. 1 is a schematic diagram of the apparatus used in the process of the present invention.

As noted, the method of the present invention for synthetic motor fuel generation is a two-phase process, which will be done in an apparatus such as is shown in FIG. 1. The first stage involves coal gasification in supercritical conditions and takes place without additional oxidant. During the second stage fuel synthesis of generated gases takes place.

The gasification of the coal involves the extraction of the hydrocarbons in the coal and is carried out in the equipment under supercritical conditions (P=300 bars). Such apparatus is known in the art, such as the apparatus disclosed in US Patent Publication No 2009/0206007 to Rodney John Allam, the teaching of which is incorporated herein by reference. The mixture of water and oxygen is used as oxidant, and a sodium hydroxide (0.75%, by weight) is used as a catalyst. The process has two phases. At the first phase at the temperature 580-600° C. coal oxidation happens, at the first phase a carbon-dioxide extraction of products is carried out at the temperature of 380-420° C. and supercritical pressure. The achieved conversion of carbon is 41-60%. As a result gaseous, liquid and solid phases occur. The gaseous phase contains $H_2$, CO and $CO_2$. The liquid phase contains benzene, toluol, and xylols. In the course of the solid phase hydrocarbons containing 18-20 atoms of carbon have been found. The gases generated by means of gasification in accordance with these methods are not suitable for their immediate coefficient usage as a fuel for current internal-combustion engine models and require additional technological processing.

The physical aspects of the reactor system are not critical and the process can be achieved using known reactors, supercritical water (SCW) systems, heaters, heat exchangers, and the like. It is how the equipment is assembled to provide the process, sequence, and elements of the present invention that is important. Thus, the present invention will include a source of SCW; a first reaction zone for reacting carbonaceous material with SCW and a catalyst under the process conditions of the present invention to convert the carbonaceous compounds to gases, including $H_2$, $CO_2$, CO, $CH_4$, and $N_2$. The supercritical fluid reaction mixture is maintained within the temperature and pressure range for sufficient time to extract hydrocarbon compounds from the coal which are converted to the gases. Conduits are used to provide suitable fluid communication between the various parts of the reactor system where appropriate.

The reactor system can include a first solid particle separator for separating ash particles from the first supercritical fluid mixture to produce separated ash particles and particle-free, first supercritical fluid mixture, and a second solid particle separator for separating char particles from the second supercritical fluid mixture to produce separated char particles and particle-free, second supercritical fluid mixture which is usually a homogenous fluid mixture of water and the conversion products. The reactor system may include a conduit for feeding separated char particles from the second solid particle separator to the first reaction zone. The conduit can include a pump, such as an Archimedean screw pump, to drive the solid particles along the conduit.

The reactor system will desirably be part of a plant that further comprises energy conversion and product recovery units. The product recovery unit comprises a phase separation system where the output is separated into a fuel gas stream; a water stream; and at least one liquid hydrocarbon stream. The water stream is usually recycled, with fresh make up water, to produce SCW. A stream of heavy hydrocarbon oil is usually produced, at least part of which may be recycled to the first reaction zone.

The first and/or second reaction zones may include devices for agitating or creating turbulence to increase mass transfer rates between the particles of coal or other carbonaceous material and the SCW. Any suitable devices may be used including static mixers or at least one internal concentric flow separation shell to increase fluid velocity for a given residence time. The number of concentric shells can be from 1 to 5. An example would be where the first reaction zone has three concentric shells providing a "four-pass" arrangement and the second reaction zone preferably has one concentric shell providing a "two-pass" arrangement. The cross-sectional area of each concentric passage can be the same as each other concentric passage in a given reactor. The "coldest" fluid would be passed through the outermost passage to reduce the temperature of the reactor wall as far as possible. The internal components of the reactor system are usually made from a metal selected from the group consisting of titanium and copper and alloys thereof.

Regarding the second stage reaction zone, similar equipment could be employed. Thus, the first stage reactor and the second stage reactor can be tubular devices with a high length to diameter ratio. Such an aspect ratio reduces the capital cost of the reactor as the reactor may have a thinner reactor wall. In addition, such an aspect ratio not only increases the length of the internal flow path and but also the fluid velocities, thereby increasing fluid turbulence and promoting good mixing. A suitable aspect ratio for the first reactor may be from about 10:1 to about 50:1, e.g. from about 30:1 to 40:1. A suitable aspect ratio for the second reactor may be from about 20:1 to about 80:1, e.g. from about 40:1 to about 60:1.

The dimensions of suitable first and second reactors depend on a number of factors including the nature of the reactions occurring therein. The first reactor may have a length from about 5 m to about 60 m, e.g. from about 30 m to about 50 m, and an internal diameter from about 0.1 m to about 4 m, e.g. from about 0.5 m to about 3 m. A suitable second reactor may have a length from about 5 m to about 50 m, e.g. about 20 m to about 40 m, and an internal diameter from about 0.05 m to about 2.5 m, e.g. about 0.1 m to about 1 m. For example, based on a duty of one million tons/year of coal feed, a suitable first reactor may have a length from about 30 m to about 50 m, and an internal diameter from about 2 m to about 3 m. A suitable second reactor may have a length from about 20 m to about 40 m, and an internal diameter from about 0.75 m to about 0.5 m.

As seen in FIG. 1, coal in the form of dust (the particle size is preferably less than 0.1 mm), or another carbonaceous source, is supplied by a feed screw (1) which doses the coal into a mixer tank (2), where a 30-50% suspension with water is prepared. The water is supplied to tank (2) by a pump (5) from a container (4). Simultaneously the second feed screw (1) doses an amount of catalyst into the mixer tank (2). The result is a coal-water suspension which is pumped from mixer tank (2) by a high-pressure pump (3) through a heat exchanger (6). The suspension is heated up to 400-450° C. and then passes into a tube (or first-stage) reactor (7) under a pressure of 240 bars. The products of the reaction in the first-stage reactor (7) and unconverted initial raw material pass into a high-pressure separator (9) via a chiller or heat exchanger (11) and a valve (8). The separation of a gaseous phase from a suspension of water and coal takes place in pressure separator (9). The pressure in the separator is maintained at the level of 120-180 bars. The separated gases containing, mainly, $H_2$, $CO_2$, $CH_4$, $N_2$, CO, $H_2O$ are re-pressurized up to 100 bar and supplied into a second-stage reactor (13) which is maintained at a temperature of 240-270° C. by means of a heat exchanger (6). In the reactor (13), the interaction of hydrogen and carbon dioxide with a copper and zinc catalyst takes place and results in water vapor and generation of an alcohol mixture of methanol, ethanol, propyl and butyl alcohols. The propyl and butyl alcohols fraction is separated from admixtures of methanol, ethanol and water in columns (15) and (16) and supplied as a ready-made product into a tank (17). Methanol, ethanol and water with the admixture of higher alcohols are sent into a tank (4) for re-processing.

The gases unreacted in a reactor (13) containing carbon dioxide and methane are supplied to a separator (14) for further burning into a waste heat boiler to get a process steam. The suspension from a separator (9) is supplied into a mechanical decanter (10), where the solid phase is separated and rinsed and further transfer into a storage container (12) for further treatment and/or utilization. From mechanical decanter (10) water vapors are pass through valve (8) are cooled in a chiller or heat-exchanger (11) and sent into a combined water collection tank (4).

Figure 2:
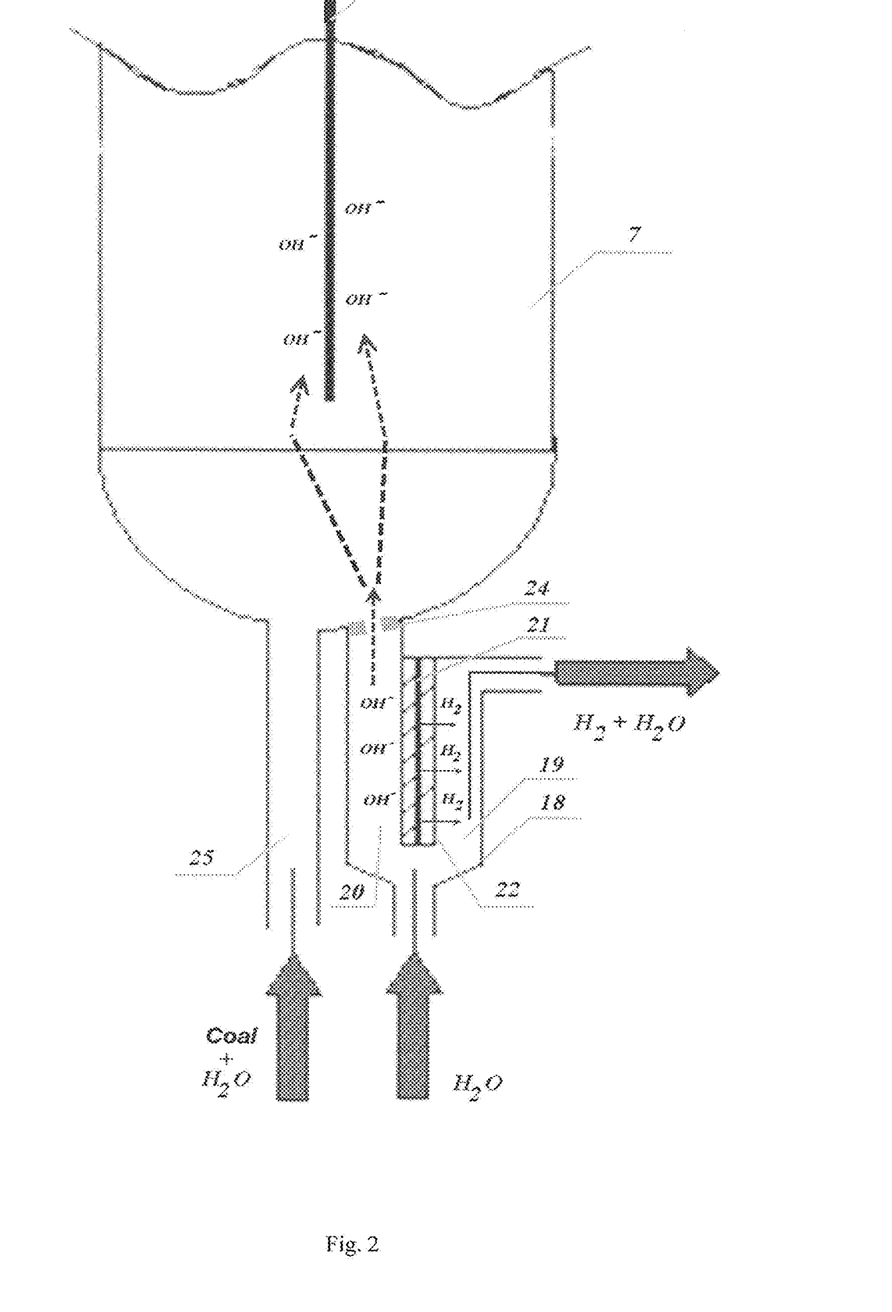
FIG. 2 is a schematic diagram of the electrolyzer which is employed in the process of the present invention and is part of the first stage reactor.

An electrolyzer, an active group generator, shown further in FIG. 2, is connected to a reactor lower flange taps (7) of the first stage. Deionized water is supplied into the electrolyzer by a separate pump under pressure with the certain intensity of flow immediately into an anode (19) and cathode (20) spaces. They are separated by a porous ceramic pipe (plate) (21), pores of which are filled with a connector possessing an injected protonic conductivity. The outer and inside sides are coated with a layer of a restored nickel catalyst with a contact carrier made from $Al_2O_3$ with specific surface area of 80-100 $m^2/g$. A thin net made of stainless steel is pressed to a catalyst from the anode side used as a negative current lead (22) to a cathode i.e. a restored nickel. A positive current lead (23) is a stainless steel rod isolated inside of a reactor vessel (7) of the first stage. An anode is a coal supplied into a reactor.

The function of an electrolyzer is as follows. Constant voltage of 2 to 10 V is supplied to current distributors. Water splitting happens from the anode side according to the reaction with a nickel catalyst $$H_2O \rightarrow H^+ + OH^- \qquad (1)$$

A proton adsorbed in a nickel under the influence of an electrostatic field is injected (is transferred into) into a proton-conductive layer of a porous ceramic base and transferred into its other side where it is restored on a nickel catalyst a cathode space to become a molecular hydrogen. Molecular hydrogen is supplied into a combined separator of high pressure (9 or 14) by a water flow. The developed groups are supplied to an anode (a disperse coal in a reactor (7)) to be oxidized to become water and oxide according to the reaction $$4OH^- - 4\bar{e} \rightarrow O_2 + 2H_2O \qquad (2)$$

Reaction (2) is an overall equation as in reality the reaction proceeds in a row of intermediate stages; the generation of atomic oxygen occurs at one of these stages. It is a well-known fact that atomic oxygen is a strong oxidant. It seems probable that the atomic oxygen oxidizes coal to become carbonic oxides provoking the start-up of a radical mechanism of coal oxidation with water in the supercritical conditions.

The circuit diagram of electrolyzer connection is a standard one and typical for common industrial electrolyzers. The discharge of water and hydrogen from a cathode space (19) is made into a separator (9) (not shown in FIG. 1).

The comparison of the proposed method with well-known analog of the brown coal processing that is close by its content, claimed in patent US 2009/0206007, has shown that non-hydrocarbon gases ($H_2$, $CO_2$, CO, $N_2$), hydrocarbon gases (alkanes and $C_1$-$C_4$ alkenes), liquid hydrocarbons (benzol, toluol and xylols) and a solid phase of $C_{16}$-$C_{18}$ are generated in the prototype, and the products generated as a result of the proposed process shall be a gaseous phase containing mainly $H_2$, $CO_2$ and $CH_4$, and a liquid phase containing a mixture of $C_1$-$C_4$ alcohols with minor content of (up to 5%, by weight) products of deeper oxidation i.e. aldehydes, acids, ethers, ketones. The generated liquid products of both processes may be used as components of motor fuels; however dimethyl ether or propyl and butyl alcohol fraction can be extracted in this method to be used as a diesel fuel that is impossible when applying the method of the prototype.

The non-hydrocarbon gases in sufficient volumes ($H_2$, $CO_2$, CO, $N_2$) generated in accordance with a well-known process do not interact to generate a motor fuel and do not require processing. The major difficulty of further processing is additional processes required to dilute sulpher and $CO_2$. In the given method all generated gases, including $H_2$, $CO_2$ and CO are supplied for the second stage to be converted into alcohols and ethers.

The main difference is the correlation of the gained liquid components: according to the well-known method is ⅓ of converted coal, and according to the proposed one is more than ⅔. This lack of balance can be explained by the fact that according to the known method non-hydrocarbon gases ($H_2$, $CO_2$ and CO) are not involved into the process of liquid products generation. Another difference is the a low temperature range of the process. In accordance with the prior art method the temperature is 400-450° C. at the first stage, and the temperature is 240-270° C. at the second stage, whereas in accordance with the known method the temperature is 580-600° C. at the first stage, and the temperature is 377-422° C. at the second stage. Yet another difference of the present invention is lack of an additional oxidant at the first stage, whereas in accordance with the prior art method pure oxygen is added thus significantly increasing the costs of making the products.

The main competitive advantage of the present method is a change of a catalyst or strengthening of its qualities with the help of an electrolyzer containing the membranes with solid proton-conducting electrolyte that allows, as it has been above stated, to generated active OH—-groups to oxidize a carbon, and also generate hydrogen that significantly improves the wastes content of coal slack, and accordingly, their further processing.

The suggested prototype and the new method have similar issues. Both methods are intended to process nonconforming coals and hydrocarbons, the processes are carried out in the supercritical conditions of water under pressure of 240-300 bars, have 2 stages, almost similar types and quantities of catalysts are employed. The similarity of these issues in the known prototype and the suggested method is a key argument when choosing a prototype. For better understanding of the suggested method of nonconforming coals (brown, slate), heavy fractions of oil refining, renewed phytogenic hydrocarbons and wood wastes are given below.

The analysis of the initial suspension and the products of the processes have been made in such a way. The samples have been taken from the initial suspension and the content of carbon and ash has been identified by means of drying up to 200° C. to gain a constant weight and calcining up to 1200° C. After the initial mixture has come through the reactor (7) of the first stage at the given temperature, pressure and consumption gaseous and liquid samples have been taken during one hour, and at the end of this hour the sample of the discharged water and coal suspension has been taken. It has been washed with distilled water, filtered and the carbon and ashes content has been analyzed in a similar way as the sample of the initial suspension.

The quantitive and qualitative content of gaseous samples have been identified by means of gas chromatography. The quantitive and qualitative content of water-soluble high-boiling hydrocarbons have been identified also by gas chromatography.

The gas generated after throttling has been supplied into a reactor of the second stage, where it has been converted into alcohols mixture under pressure of 100-150 bars with a cooper and zinc catalyst. The sample for a chromatographic analysis has been taken after a gas coming through the reactor (13) and a separator (14) (FIG. 1). The liquid sample of the mixture of the generated alcohols has been taken from the bottom of a separator (14) and also analyzed according to a gas-chromatographic method.

As in the course of the process a big number of different substances have been generated (especially in the liquid phase and slack), then to simplify the analysis of the taken samples the convertibility level of carbon has been changed into a summarized carbon of all generated products+unreacted carbon.

Thus, the recalculated analysis has given the initial carbon (of coal) minus its conversion portion in gaseous and liquid phases, and as well as an unconverted residue.
The water conversion level that is a second reacting agent and supplied in significant abundance, has been evaluated according to the hydrogen content in the gaseous phase.

At the second stage a carbon and hydrogen of the gaseous phases of the first stage haven taken to measure a carbon portion converted into an alcohol mixture and the portion of the unreacted substance during one cycle.

The above described method to analyze the products, allows for the description of the essence of the present process.

Example 1

A 30%-coal suspension in water without a catalyst was supplied into a reactor during six hours with the consumption of 5 g of coal per hour (carbon content is 3.6 g). The content of a brown coal is as follows: water, adsorbed gases and volatile organic compounds when drying up to 200° C.-2.7%, by weight.; organic carbon content burning up to 1200° C.-72.5%, by weight.; ash-24.8%. The reaction was carried out at the temperature of 390-450° C. The gas generated in the reactor of the first stage was supplied into the reactor of the second stage to be converted at the temperature of 240-270° C. The pressure in the reactor of the first stage was 240 bars; the second one was 100 bars. The results are shown in Table 1.

Example 2

A 30%-coal suspension in water with $Ca(OH)_2$ catalyst with the quantity of 3.01 g for the whole coal was supplied into the reactor during six hours with the speed of 5 g per hour. The interaction were carried out at the temperature of 390-450° C. The generated gas was supplied into the reactor of the second stage functioning at the temperature of 240-270° C. The pressure in the reactor of the first stage has been 240 bars; the second one was 100 bars. The results are shown in Table 1.

Example 3

A 30%-coal suspension in water with NaOH catalyst with the quantity of 1.52 g for the whole coal was supplied into the reactor during six hours with the speed of 5 g per hour. The reaction was carried out at the temperature of 390-450° C. and with the pressure of 240 bars. The generated gas was supplied into the reactor of the second stage functioning in the mode similar to the one described in examples 1 and 2. The results are shown in Table 1.

Example 4

A 30%-coal suspension in water without a catalyst was supplied into a reactor during six hours with the consumption of 5 g of coal per hour. An electrolyzer was connected to the reactor of the first stage, the functioning mechanism has been described above, and the scheme is shown in FIG. 2. The reaction was carried out at the temperature of 390-450° C. and with the pressure of 240 bars. The generated gas was supplied into the reactor of the second stage functioning in the mode similar to the one described in examples 1 and 2. The results are shown in Table 1.

Example 5

The initial raw source taken as it has been described in examples 1-4, with an industrial catalyst of oil fraction hydro treating that contain nickel, cobalt and molybdenum compounds in the quantity of 3.00 g for the whole coal was supplied into the reactor during six hours with the consumption of 5 g per hour for coal and 0.5 g per hour for a catalyst. The temperature and pressure at the first stage of the process were similar to the ones described in examples 1-4. The generated gas was supplied into the reactor of the second stage functioning in the mode similar to the one described in examples 1-4. The experimental data are shown in Table 1.

Example 6

The initial raw source taken as it has been described in examples 1-5, with $Ca(OH)_2$, catalyst in the quantity of 15.00 g for the whole coal was supplied into the reactor during six hours with the consumption of 5 g per hour for coal and 2.5 g per hour for a catalyst. The temperature range and the pressure at the first stage of the process were similar to the ones described in examples 1-5. The generated gas has been supplied into the reactor of the second stage where the temperature of 200-220° C. was maintained. The pressure in the reactor of the first stage was 240 bars; the pressure in the reactor of the second stage was 150-180 bars. The results are shown in Table 1.

Example 7

The initial raw source with a $Ca(OH)_2$ catalyst in the quantity as it has been described in example 2 has been supplied into the reactor during six hours with the consumption of 2.5 g per hour. The temperature range and the pressure of the process have been similar to the ones described in example 2. The results are shown in Table 1.

Example 8

The initial raw source and the catalyst that have been used in the experiment are similar to the ones described in example 2. The given mixture was supplied into the reactor of the first stage with the speed of 1.2 g/h. The temperature range and the pressure of the process have been similar to the ones described in example 7. The experimental data are shown in Table 1.

In examples 1-3 and 5 the process of the present invention achieved the conversion of a brown coal (bituminous coals, heavy oil products, wastes containing hydrocarbons and/or carbohydrates, wood wastes and agricultural wastes) has been shown using different catalysts, particularly metals of an alkaline-earth group in the form of hydroxides, oxides or carbonates; metals of an alkaline group in the form of hydroxides, oxides or carbonates; solid industrial alumino-nickel-molybdenum catalyst of hydrocracking processes and hydrogen refining (4-6% Ni, 8-12% $MoO_3/Al_2O_3$).

The most efficient catalyst at the first stage of these experiments is $Ca(OH)_2$, the conversion speed at 390 and 450° C. has been 0.136 and 0.616 g/h accordingly. The carbon in the gas content generated at the first stage at 390 and 450° C. has been converted into a targeted fraction of $C_1$-$C_4$ alcohols with the speed of 0.072 and 0.311 g/h accordingly at the second stage. The mole ratio of $H_2/CO_2$ at the first stage has been 3.78 and 18.2 accordingly at the conversion temperature of 390 and 450° C. The highest mole ratio of syngas at the input of the second stage reactor allows to generate an alcohol fraction with a weight ratio of $C_1$-$C_2/C_3$-$C_4$=1/4. This fraction may be used as a diesel fuel and an additive to an oil diesel fuel.

The comparison of the examples 2 and 3 shows to achieve the goal set in the given method the synthesized gas ($H_2$+ $CO_2$) with the mole ratio of 2.8 and 4.4 accordingly is developed with the catalyst made of alkali metals in the form of oxides hydroxides, oxides or carbonates at the temperature of 380 and 450° C. at the first stage This ratio at the input of the second stage reactor allows to generate the targeted $C_1$-$C_4$ alcohol fraction with a weight ratio of $C_1$-$C_2/C_3$-$C_4$=2/1.

The comparison of the examples 2 and 3 to achieve the goal set to generate synthetic motor fuel in a two stage process in the supercritical conditions of water and $CO_2$ according to the first and the second stage shows that using different catalysts such as $Ca(OH)_2$ and NaOH different targeted alcohol fractions of different content and wastes of different content are generated. The application of $Ca(OH)_2$ leads to high-ash coal slacks (ash content up to 20%), whereas when using NaOH the ash content is low (up to 5%). Thus, the generated coal waste may be carbonized or used in producing coal low-ash electrodes without sulphur of angular electrical melting furnaces.

The comparison of the examples 1 and 5 supports the generation of synthetic motor fuel in a two stage process in the supercritical conditions of water and carbon dioxide and shows that the industrial alumino-nickel-molybdenum catalyst also generates a syngas, though it mainly consists of methane, and hydrogen and carbon dioxide are contained in it in insignificant quantities. Such a process implementation may be employed to generate a fuel in the form of methane. The ash quantity of the first stage is 26%. The catalyst regeneration may be possible only in specially arranged conditions.

One has been carried out the comparison of the examples 1, 2, 3, 5 and example 4 where to achieve the goal set to generate synthetic motor fuel in a two stage process in the supercritical conditions of water and carbon dioxide an electrolyzer with a solid proton conducting instead of different catalyst has been employed. So, in example 4 an electrolyzer, which structure is shown in FIG. 2, connected to the bottom of the first stage reactor generated H+ and OH— ions. H+ ions have been diverted by means of proton conducting membrane from a reaction space, and OH— have been catalytic particles of carbon conversion in the course of regeneration that reached the speed of up to 10 mg/h at the temperature of 380° C. at the first stage that is 10 times bigger than in applying the non-catalytic method in Example 1 and much lower than the conversion speed with $Ca(OH)_2$ catalyst in example 2. The carbon conversion at the first stage in accordance with the example 4 is proportional to the quantity of the generated OH—-groups. In its turn, OH—-groups generation may be increased strengthening the power of an electrolyzer. The employed electrolyzer in example 4 has function in the conditions of direct current with the voltage of 5 V and the current intensity of 0.05 A that conforms to the required power of 0.25 W. Such low energy consumption to generate reactive species makes this method very promising. Another competitive advantage of an electrolytic method is low-ash level of wastes that does nit exceed 3%. The generated synthesized gas ($H_2+CO_2$) has a low mole ratio of $H_2/CO_2$ at the first stage and that is why the targeted alcohol fraction generated at the second stage has a weight ratio of $C_1$-$C_2$/$C_3$-$C_4$=4/1. This fraction may be used as an additive to gasolines or be an initial raw source to generate a dimethyl ether.

The comparison of the examples 2 and 6 where to achieve the goal set to generate synthetic motor fuel in a two stage process in the supercritical conditions of water and carbon dioxide according to example 6 it is used 5 times more of $Ca(OH)_2$ catalyst than in example 2. Such a significant increase of the catalyst quantity leads to the fact that the syngas generated at the first stage consists mainly of $H_2$ with $CO_2$ and $N_2$ admixtures. The second stage reactor functions at a low temperature of (200-220° C.) and with much higher pressure of 150 bars as an absorber for an advanced treatment of hydrogen to dilute $CO_2$. Hydrogen is generated in such a method that is a rather valuable and promising high-energy fuel.

The coal slack generated in wastes at the first stage with the ash-level of up to 3% may be employed as a raw source to produce cement.

The comparison of the examples 7, 8 and 2, where to achieve the goal set to generate synthetic motor fuel in a two stage process in the supercritical conditions of water and carbon dioxide the possibility to increase the combined coal conversion by means of increasing the time of the initial mixture presence in a reaction zone of the first stage is shown. The total carbon conversion in example 2, taken as a basic one, makes up from 4 to 20% at the temperatures of 390 and 450° C. accordingly with the 30% coal conversion consumption of 3.6 g/h for a coal. In example 7 the consumption of 30% coal suspension for a coal has been halved with the similar ratio of carbon/catalyst. The total conversion of a carbon increased 2.7 times and reached 19 and 71.1% accordingly at 390 and 450° C. In example 8 the consumption of 30% coal suspension for a coal has been halved with the same ratio of carbon/catalyst. The total carbon conversion at the first stage reached 43 and 76% accordingly at the temperatures of 390 and 450° C.

The ash level of coal slack in example 8 reached 50%. The mole rate of $H_2/CO_2$ has been 4/1 and 9.4/1 at 390 and 450° C. accordingly. Such a ratio allows for the generation of a targeted fraction of $C_1$-$C_4$, alcohols with a weight ratio of $C_1$-$C_2$/$C_3$-$C_4$=1/2.9, that may be used a diesel fuel or an additive to an oil fuel.

The ashes of the initial and treated coals are different. Under the supercritical conditions the activity of non-organic compounds is increased and their dissolubility in water is increased too. Formed water-soluble compounds are washed by water. The most stable ones are silicon containing salts. More soluble compounds are sulphates and sulphides of alkaline-earth metals.

The increase or decrease of ash content in the wastes is depended on the nature of catalyst. The calcium compounds give rise to the increase of ash mass. Sodium compounds or no catalyst (just supercritical water) cause the decrease of ash mass at the expense of the formation of water-soluble sulphates and sulphides of sodium drained with water.

The following are benefits and features from the process of the present invention:

A decreased temperature and pressure at the first stage of the process;

The lack of (or no need for) additional oxidant in the form of oxygen at the first stage;

Better results of total carbon conversion at much lower temperatures;

An extended range of generated synthetic motor fuels;

Products that are ready to be used and do not require additional processing;

A new electrolytic activation for the process;

A better active and selective catalyst.

The process of the present invention can be varied as follows:

1. The use of different coals, slate stones, peat, low-grade oil and oil pitches, residues of renewable biomass, organic agricultural wastes, agricultural wastes, woodwastes and chemical wastes, public utility companies and plants to generate hydrogen, methane, synthesized gas ($H_2+CO_2$), $C_1$-$C_4$ alcohols, synthetic motor fuels and additives to oil fuels, as well as ash-free technical carbon, consists in carrying out a two-stage gasification process where at the first stage with a catalyst and an oxidant $H_2$, $CO_2$, CO, $C_1$-$C_4$ alkane and alkene gases in supercritical conditions at the temperature of over 580° C. and with the pressure of 300 bars are generated, at the second stage liquid oxygen containing and aromatic product are extracted from a coal slack transferred from the first stage in the supercritical conditions of carbon dioxide at the temperature of 370-420° C. and with the pressures to make supercritical conditions of $CO_2$, with the differential feature, that a 30% water and coal suspension with a volume speed of 0.01-0.05 g of carbon for 1 cm3 of the reactor space per hour in a mole ratio with a catalyst of 70/90, where a catalyst, that is an alkaline-earth metal in the form of an oxide, hydroxide or carbonated is processed at the significantly low temperature of 390-450° C. and with the pressure of 240 bars without an additional oxidant with the coal conversion of 46-74% at the first stage, with the differential feature, that gases of the first stage $H_2$, $CO_2$, CO, $CH_4$, $N_2$, but not the coal slack, are supplied at the second stage where with a copper and zinc contact at the temperature of 200-270° C. and with the pressure of 100 bars $C_1$-$C_4$ alcohols are with a weight ratio of $C_1$-$C_2$ to $C_3$-$C_4$ equaled 1/4, at that the hydrogen and carbon conversion is 90-100 and 60-80% accordingly.

2. Varying the process in that at the first stage a catalyst mole content in a water and coal suspension is increased, at that the ratio of 8-10 does not become less, the generated gases are supplied to the second stage where with a copper and zinc catalyst at the temperature of 200-220° C. and with the pressure of 150 bars hydrogen is generated with the purity of 90-93% with the total coal conversion of 70%.

3. A process with the differential feature, that gasification is carried out with a catalyst based on an aluminum oxide with applied nickel (2-4%) and molybdenum (8-12%), supplied to the reactor together with a water and coal suspension with the volume speed of 0.01-0.05 g of carbon for 1 cm³ of the reactor space per hour with the mole ratio of carbon/metal nickel equaled 180-190, at that the carbon conversion of 3-20% for a cycle is reached, the generated gas is supplied to a copper and zinc catalyst at the temperature of 280° C. and with the pressure of 150 bars converts into a methane with $CO_2$ and $N_2$ admixture in the quantity of 10-27%, with the hydrogen and coal conversion of 95-100 and 65-75% accordingly at the second stage.

4. A process with the differential feature, that at the first stage an alkali metal with the conditions of supplying of a 30% water and coal suspension with a volume speed of 0.01-0.05 g of coal for 1 cm3 of the reactor space per hour with the mole ratio of 70/90 with a catalyst instead of an alkaline-earth metal under conditions allowing to supply coal till a carbonizing low-ash desulfurized carbon with the purity of 90-97% and total coal conversion of 6-30%, and the generation gas with the mole ratio of $H_2/CO_2$ equaled 2,8-6,4, that allows to generated $C_1$-$C_4$ alcohols with the weight ratio of $C_1$-$C_2$ to $C_3$-$C_4$ equaled 2/1 with the total conversion of hydrogen and 75% carbon dioxide conversion at the second stage.

5. A process with the differential feature, that at the first stage en electrolyzer with the voltage of 0.25 W, that generates reactive OH— hydroxyl species, supplied to the reactive zone where a 30%-water and coal mixture with the volume speed of 0.01-0.05 g of carbon for 1 cm$^3$ of the reactor space per hour, at that the carbon conversion reaches 2-10%, and the technical carbon generates 95-97%, and the generated gases with the mole ratio of $H_2/CO_2$ equaled 1,7-2,2, allow to generate $C_1$-$C_4$ alcohols at the temperature of 240-270° C. and with the pressure of at least 100 bars, preferably 110-150 bars, with the weight ratio of $C_1$-$C_2$ and $C_3$-$C_4$ equaled 5/1 with the total hydrogen conversion and 75% carbon dioxide conversion at the second stage.

The foregoing embodiments of the present invention have been presented for the purposes of illustration and description. These descriptions and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated.

TABLE 1

| 1 | Temperature in a first stage reactor ° C. | Examples | | | |
|---|---|---|---|---|---|
|   |   | 1 | 2 | 3 | 4 |
| 1 | 2 | 3 | 4 | 5 | 6 |
| Coal content of the initial suspension, % | n/u | 30 | 30 | 30 | 30 |
| Coal consumption at the first stage reactor, g/h | n/u | 3.6 | 3.6 | 3.6 | 3.6 |
| Catalyst consumption in the reactor of the first stage, g/h | n/u | — | Ca(OH)$_2$ 0.5 | NaOH 0.25 | — |
| Electrolysis U, V | n/u | — | — | — | 5.0 |
| I, MA |  | — | — | — | 50 |
| Temperature in the first stage reactor, ° C. | n/u | 390-450 | 390-450 | 390-450 | 390-450 |
| Pressure in the first stage reactor, bars | n/u | 240 | 240 | 240 | 240 |
| Hydrogen quantity in the gaseous phase, g/h | 390 | 0.001 | 0.011 | 0.006 | 0.011 |
|  | 450 | 0.004 | 0.101 | 0.025 | 0.008 |
| Total gaseous phase | 390 | 0.013 | 0.121 | 0.081 | 0.040 |
| carbon | 450 | 0.017 | 0.599 | 0.182 | 0.025 |
| quantity, liquid phase | 390 | 0.002 | 0.015 | 0.021 | 0.040 |
| g/h | 450 | 0.004 | 0.057 | 0.050 | 0.035 |
| Selectivity of hydrogen at the first stage, % | 390 | 33.0 | 50.0 | 55.6 | 74.2 |
|  | 450 | 44.0 | 45.7 | 45.5 | 53.3 |
| Carbon/ash content in the wastes of the first stage, % | 390 | 85.7/14.3 | 77.6/22.4 | 89.7/10.3 | 94.6/5.4 |
|  | 450 | 87.0/13.0 | 73.7/26.3 | 97.1/2.9 | 97.3/2.7 |
| Carbon conversion for a cycle at the first stage, % | 390 | 0.4 | 3.8 | 2.8 | 2.2 |
|  | 450 | 0.6 | 18.2 | 6.4 | 1.7 |
| Mole ratio of $H_2/CO_2$ at the first stage | 390 | 1.0 | 0.8 | 2.3 | 8.8 |
|  | 450 | 4.5 | 18.2 | 6.4 | 1.7 |
| Temperature in the second stage reactor, ° C. | n/u | 240-270 | 240-270 | 240-270 | 240-270 |
| Pressure in the second stage reactor, bars | n/u | 100 | 100 | 100 | 100 |
| Supplied to the second stage, g/h | 390 | 0.013 | 0.121 | 0.081 | 0.040 |
| Supplied to the second stage, g/h | 450 | 0.017 | 0.600 | 0.182 | 0.025 |
| Converted into alcohols at the second stage, g/h (%) | 390 | 0.008 (61.5) | 0.072 (60) | 0.071 (87.7) | 0.030 (75) |
| Converted into alcohols at the second stage, g/h (%) | 450 | 0.004 (23.5) | 0.311 (50.8) | 0.097 (53.6) | 0.007 (28) |
| Unreacted at the second stage, g/h (%) | 390 | 0.006 (46.2) | 0.049 (40) | 0.010 (12.4) | 0.010 (25) |
| Unreacted at the second stage, g/h (%) | 450 | 0.013 (76.5) | 0.300 (49.2) | 0.089 (48.9) | 0.018 (72) |
| Hydrogen conversion at the second stage, % | 390 | ~100 | ~100 | ~100 | ~100 |
| Hydrogen conversion at the second stage, % | 450 | ~100 | 73.4 | ~100 | ~100 |
| Total selectivity of carbon conversion for the targeted products, % | 390 | 53.3 | 44.1 | 69.6 | 50.0 |
| Total selectivity of carbon conversion for the targeted products, % | 450 | 19.0 | 47.3 | 41.8 | 11.2 |

| 1 | Examples | | | | |
|---|---|---|---|---|---|
|   | 5 | 6 | 7 | 8 | Prototype |
|   | 7 | 8 | 9 | 10 | 11 |
| Coal content of the initial suspension, % | 30 | 30 | 30 | 30 | 50 |
| Coal consumption at the first stage reactor, g/h | 3.6 | 3.6 | 1.8 | 0.95 | C + O$_2$ |
| Catalyst consumption in the reactor of the first stage, g/h | ANM 0.5 | Ca(OH)$_2$ 2.5 | Ca(OH)$_2$ 0.25 | Ca(OH)$_2$ 0.15 | NaOH 0.75% |
| Electrolysis U, V | — | — | — | — | — |
| I, MA | — | — | — | — | — |
| Temperature in the first stage reactor, ° C. | 390-450 | 390-450 | 390-450 | 390-450 | 580-600 |
| Pressure in the first stage reactor, bars | 240 | 240 | 240 | 240 | 300 |
| Hydrogen quantity in the gaseous phase, g/h | 0.007 | 0.032 | 0.030 | 0.050 | Alkenes + |
|  | 0.018 | 0.122 | 0.280 | 0.440 | alkanes $C_1$-$C_4$ |
| Total gaseous phase | 0.064 | 0.200 | 0.330 | 0.330 |  |
| carbon | 0.084 | 0.330 | 1.250 | 0.710 |  |
| quantity, liquid phase | 0.007 | 0.041 | 0.010 | 0.080 |  |
| g/h | 0.002 | 0.072 | 0.03 | 0.010 |  |
| Selectivity of hydrogen at the first stage, % | 45.2 | 96.8 | 48.0 | 46.3 |  |
|  | 41.3 | 52.0 | 49.2 | 49.0 |  |

TABLE 1-continued

| | | | | | |
|---|---|---|---|---|---|
| Carbon/ash content in the wastes of the first stage, % | 76.2/23.8 | 48.3/51.7 | 70.9/29.1 | 81.0/19.0 | |
| | 73.7/26.3 | 47.1/52.9 | 51.0/49.0 | 51.0/49.0 | |
| Carbon conversion for a cycle at the first stage, % | 2.8 | 6.7 | 19.0 | 43.2 | — |
| | 3.0 | 8.4 | 71.1 | 76.3 | |
| Mole ratio of $H_2/CO_2$ at the first stage | 1.0 | — | 2.0 | 3.8 | |
| | 3.0 | — | 6.1 | 9.4 | |
| Temperature in the second stage reactor, °C. | 240-270 | 200-220 | 240-270 | 240-270 | 380-420 |
| Pressure in the second stage reactor, bars | 100 | 150 | 100 | 100 | 300 |
| Supplied to the second stage, g/h | 0.064 | 0.200 | 0.330 | 0.330 | |
| Supplied to the second stage, g/h | 0.084 | 0.330 | 1.250 | 0.710 | |
| Converted into alcohols at the second stage, g/h (%) | 0.042 (64.8) | — | 0.198 (60) | 0.250 (62) | aromatic $C_8$-$C_{20}$ |
| Converted into alcohols at the second stage, g/h (%) | 0.012 (32.8) | — | 0.630 (50) | 0.340 (48) | aromatic $C_8$-$C_{20}$ |
| Unreacted at the second stage, g/h (%) | 0.023 (35.2) | 0.018 | 0.132 (40) | 0.08 (38) | |
| Unreacted at the second stage, g/h (%) | 0.063 (67.2) | 0.108 | 0.620 (50) | 0.370 (52) | |
| Hydrogen conversion at the second stage, % | ~100 | — | ~100 | ~100 | |
| Hydrogen conversion at the second stage, % | ~100 | — | ~100 | ~100 | |
| Total selectivity of carbon conversion for the targeted products, % | 67.8 | — | 58.8 | 58.0 | 40-60 |
| Total selectivity of carbon conversion for the targeted products, % | 19.4 | — | 52.8 | 52.0 | 40-60 |

Note:
n/u = not used.

What we claim is:

1. A method for generation of synthetic motor fuels, $C_1$-$C_4$ alcohols, hydrogen, methane, synthesized gas ($H_2$+$CO_2$), and additives to oil fuels by hydrothermal treatment of carbonaceous compounds comprising the steps of:

providing a two-stage process operated under the supercritical conditions of $H_2O$ and $CO_2$, including a first stage gasification reactor having a reactor zone for the conversion of carbonaceous compounds and a second stage reactor for the conversion of the products of the first stage;

feeding a aqueous suspension of carbonaceous compound and an alkali metal or alkaline-earth metal catalyst through said first stage gasification reactor as a supercritical fluid at a volume velocity of 0.01-0.05 g of carbon per 1 cm$^3$ per hour, at a carbon/catalyst mole ratio of between about 70/1 and 90/1, at a temperature of 390-450° C., and under a pressure of about 225 to 500 bars;

feeding the reaction products from the first stage to the second stage over a copper-zinc catalyst at a temperature of 200-280° C. and under the pressure of at least about 100 bars so that any gases generated in the first stage are converted into $C_1$-$C_4$ alcohols fraction with a weight ratio of $C_1$-$C_2$ to $C_3$-$C_4$ equal to between about 0-35% to 100-65%.

2. Method according to claim 1 wherein in the first stage the carbon/catalyst mole ratio 80/1, and the gases generated at the first stage are converted in the second stage at a temperature of 200-220° C. and under a pressure of about 150-180 bars to produce hydrogen with a purity of 90-93%, to thereby achieve a total carbon conversion of 70%.

3. Method according to claim 1 wherein gasification is carried out over a catalyst based on aluminum oxide with applied nickel (2-4%) and molybdenum (8-12%), supplied to the first stage gasification reactor together with a water-coal suspension with a mole ratio of carbon/metal nickel of 180-190, so that a carbon conversion of 3-20% per pass is achieved, and at the second stage the generated gases are converted at a temperature of 280° C. and under the pressure of 150 bars into methane with $CO_2$ and $N_2$ admixture in the quantity of 10-27%, with a hydrogen and carbon conversion of 95-100 and 65-75% respectively.

4. Method according to claim 1 wherein in the first stage the initial suspension is converted with an alkali metal catalyst, whereby gases with the $H_2/CO_2$ mole ratio equal to 2.8-6.4 are produced, and the second stage generates $C_1$-$C_4$ alcohols with the weight ratio of $C_1$-$C_2$ to $C_3$-$C_4$ of 60-80% to 40-20% with the complete conversion of hydrogen and 75% carbon dioxide conversion.

5. Method according to claim 1 wherein the first stage further employs an electrolyzer having a power of 0.25 W, that generates reactive OH-species which function as a catalyst and are supplied to the reactive zone and wherein the water-coal mixture has a volume velocity of 0.01-0.05 g of carbon for 1 cm$^3$ of the reactor space per hour, that the carbon conversion reaches 2-10%, and that the carbon generates 95-97%, and in the second stage the generated gases with the mole ratio of $H_2/CO_2$ equaled 1.7-2.2 and allow for the generation of $C_1$-$C_4$ alcohols at the temperature of 240-270° C. and under the pressure of 100 bars with the weight ratio of $C_1$-$C_2$ and $C_3$-$C_4$ being about 70-100% to about 30-0% with the complete hydrogen conversion and 75% carbon dioxide conversion.

6. The method of claim 1 wherein the carbonaceous wastes are selected from the group consisting of coals, slate stones, peat, low-grade oil and oil pitches, residues of renewable biomass, organic agricultural wastes, wood wastes, chemical wastes, and mixtures thereof.

7. The method of claim 1 wherein the gases generated in the first stage gases include $H_2$, $CO_2$, CO, $CH_4$, and $N_2$.

8. The method of claim 1 wherein the hydrogen and carbon conversions in stage 2 are 90-100 and 60-80% respectively.

9. The method of claim 1 wherein the catalyst of the first-stage is in the form of hydroxide.

10. The method of claim 1 wherein the catalyst of the second stage is a copper-zinc-aluminum catalyst.

11. The method of claim 1 wherein the catalyst is present in an amount of from 1.0 to 5.0% by weight based upon the weight of the carbonaceous compounds.

12. The method of claim 1 wherein the carbon/catalyst ratio is 75/1.

13. The method of claim 1 wherein the carbonaceous compound is an aqueous suspension and the carbonaceous compound is present in an amount of at least 30% by weight.

14. A method for generation of synthetic motor fuels, $C_1$-$C_4$ alcohols, hydrogen, methane, synthesized gas ($H_2$+ $CO_2$), and additives to oil fuels by hydrothermal treatment of carbonaceous compounds comprising the steps of:

providing a two-stage process operated under the supercritical conditions of $H_2O$ and $CO_2$, including a first stage gasification reactor having a reactor zone for the conversion of carbonaceous compounds and a second stage reactor for the conversion of the products of the first stage;

providing an electrolyzer with a power of 0.25 W, that generates reactive OH-species which are supplied to the reactive zone and function as a catalyst;

feeding a aqueous suspension of carbonaceous compound and reactive OH-species through said first stage gasification reactor as a supercritical fluid at a volume velocity of 0.01-0.05 g of carbon per 1 $cm^3$ per hour, at a carbon/catalyst mole ratio of between about 70/1 and 90/1, at a temperature of 390-450° C., and under a pressure of 240 bars;

feeding the reaction products from the first stage to the second stage over a copper-zinc catalyst at the temperature of 200-280° C. and under the pressure of at least about 100 bars so that any gases generated in the first stage are converted into $C_1$-$C_4$ alcohols fraction with a weight ratio of $C_1$-$C_2$ to $C_3$-$C_4$ equal to 1/4.

15. The method of claim 14 wherein the carbonaceous compound is present in the aqueous suspension in an amount of at least 30% by weight.

16. The method of claim 14 wherein the current intensity of the electrolyzer is 50 mA.

17. The method of claim 14 wherein the carbonaceous wastes are selected from the group consisting of coals, slate stones, peat, low-grade oil and oil pitches, residues of renewable biomass, organic agricultural wastes, wood wastes, chemical wastes, and mixtures thereof.

18. The method of claim 14 wherein the gases generated in the first stage gases include $H_2$, $CO_2$, CO, $CH_4$, and $N_2$.

* * * * *